United States Patent [19]
Lochmiller

[11] Patent Number: 5,967,619
[45] Date of Patent: Oct. 19, 1999

[54] TRACTOR WHEELS

[76] Inventor: Alan W. Lochmiller, 3040 Q Ave., Denison, Iowa 51442

[21] Appl. No.: 08/881,917

[22] Filed: Jun. 25, 1997

[51] Int. Cl.⁶ .................................................. B60B 15/02
[52] U.S. Cl. ............................................ 301/43; 301/41.1
[58] Field of Search ................................ 301/40.1, 40.2, 301/41.1, 43, 44.1, 44.3, 44.4, 45, 46, 50

[56] References Cited

U.S. PATENT DOCUMENTS

| | | | |
|---|---|---|---|
| 243,463 | 6/1881 | Schaefer | 301/41.1 |
| 1,342,493 | 6/1920 | Zieche | 301/41.1 |
| 1,402,611 | 1/1922 | Holland | 301/50 X |
| 1,412,359 | 4/1922 | Lacy | 305/4 |
| 2,171,098 | 8/1939 | Ragland, Sr. et al. | 301/44.3 X |

FOREIGN PATENT DOCUMENTS 552203   3/1943   United Kingdom .................... 301/46

*Primary Examiner*—Russell D. Stormer
*Attorney, Agent, or Firm*—Hill & Simpson

[57] ABSTRACT

The present invention provides tractor wheels which are mountable to off-road tractors and provide increased traction between the tractor wheels and the ground terrain. The tractor wheels have a round rim which can be mounted to a rear axle of the tractor. A plurality of lugs extend from the rim in a plurality of rows. The lugs have an angled face which strikes and penetrates the ground to provide traction and propel the tractor forward as the tractor wheel rotates.

18 Claims, 1 Drawing Sheet

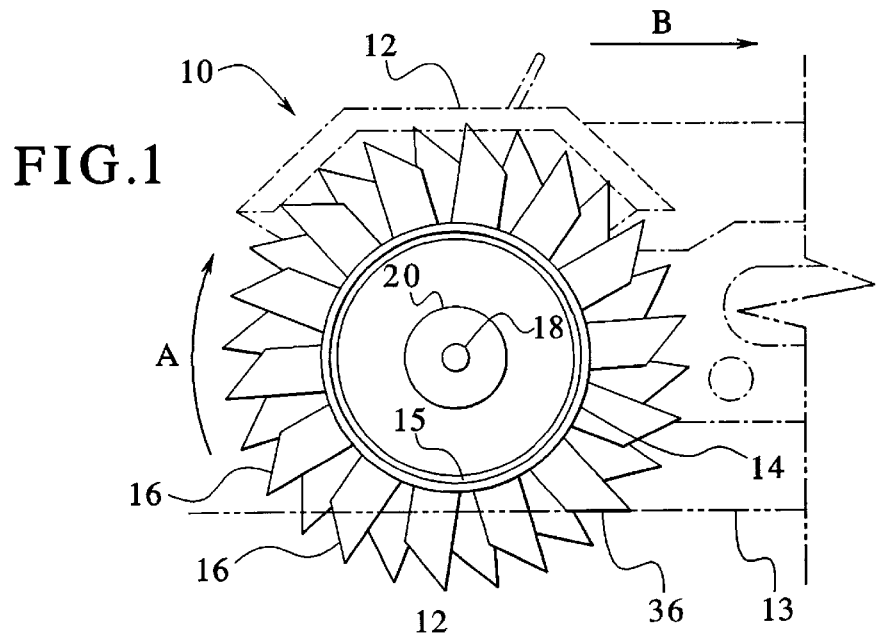
FIG.1
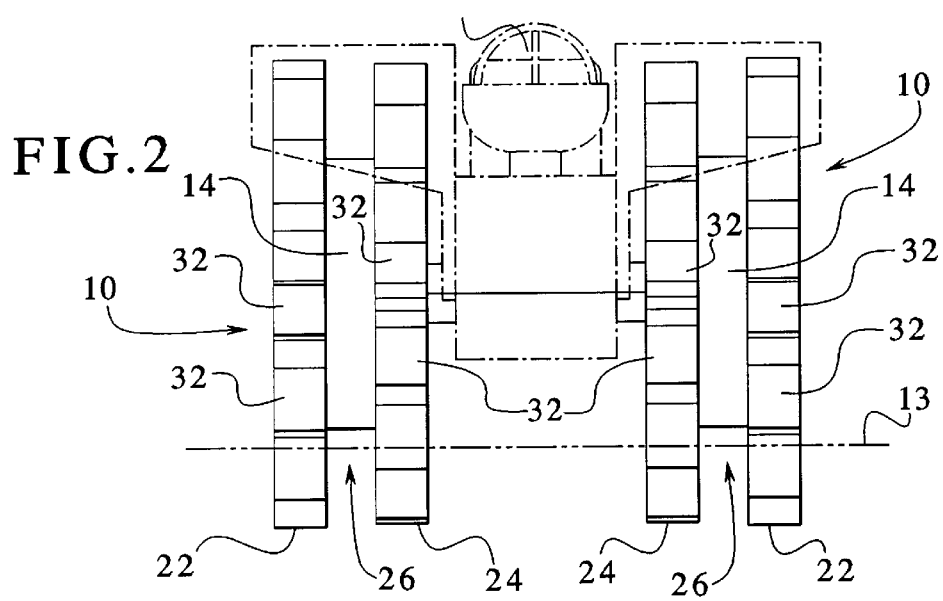
FIG.2
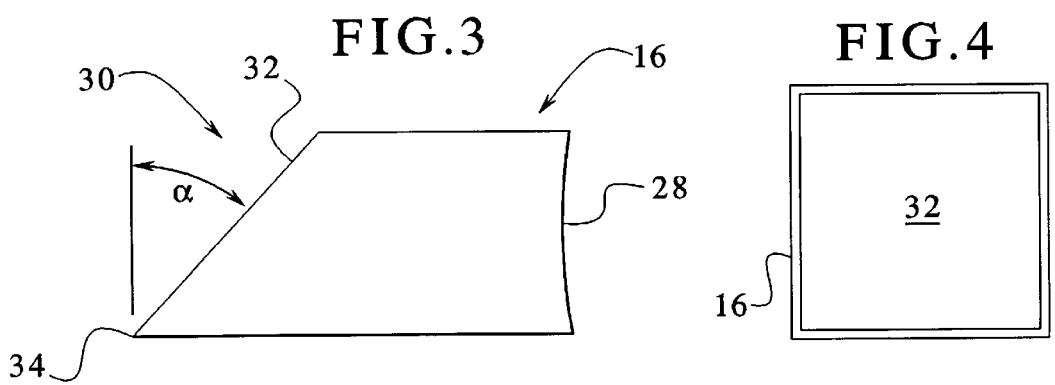
FIG.3
FIG.4

TRACTOR WHEELS

FIELD OF THE INVENTION

The present invention generally relates to tractor wheels and more specifically, the present invention relates to tractor wheels which provide improved traction for off-road tractors.

BACKGROUND OF THE INVENTION

Off-road tractors are well known vehicles used for various applications, for example tractor pulling contests, farming and hauling loads over off-road terrain. Proper traction between the off-road tractor and the ground is desirable. Increased traction is particularly desired for plowing fields and tractor pulling contests. Tractor pulling contests are competitive events which include pulling a weighted sled over off-road terrain. One objective of tractor pulling is to pull the sled over the greatest distance. Each tractor pulls the weighted sled as far as it can, usually until the rear tractor wheels slip and loose traction with the ground. Accordingly, increased traction between the tractor, specifically the rear tractor wheels, and the ground terrain is desired. Increased traction can result in any given tractor pulling the weighted sled a greater distance than the pulling distance with lesser traction. Increased traction can also prevent the tractor wheels from slipping and getting stuck in the ground, for example when plowing a field.

Increased traction may also be desirable for operating an off-road tractor during other applications. Farming operations or hauling loads over off-road terrain, such as hard ground, soft ground, muddy ground conditions, and rough terrain are some examples of various ground conditions in which enhanced traction may be desired.

SUMMARY OF THE INVENTION

The present invention provides tractor wheels which are mountable to off-road tractors and provide increased traction between the tractor wheels and the ground terrain. The tractor wheels have a round rim which can be mounted to an axle of the tractor. A plurality of lugs extend from the rim in a plurality of rows. The rows of lugs are angularly offset from each other and are spaced apart from each other along the width of the rim. When two rows of lugs are utilized, the two rows of lugs are spaced apart from each other such that each lug in a given row is centered between two adjacent lugs in the other row of lugs. The lugs have an angled face which strikes and penetrates the ground to provide traction and propel the tractor forward as the tractor wheel rotates. The lugs also tend to maintain the wheel and the axle of the tractor at a relatively constant height above the ground which improves traction and assists in preventing the tractor wheel from spinning freely and from getting stuck in the ground. The lugs provide a relatively long pulling stroke as the wheel rotates and the lugs pass through the ground. The tractor wheels are particularly useful for providing increased traction when the tractor is pulling a sled during a tractor pulling contest.

The tractor wheels of the present invention are particularly suited for use as rear tractor wheels because the tractor provides a driving force to the rear wheels. The new tractor wheels can be used with various front tractor wheels, including rubber front wheels and front wheels designed to increase traction. It may be desirable to weigh down the front end of the tractor having the new rear tractor wheels due to the increased traction provided by the rear wheels.

BRIEF DESCRIPTION OF THE DRAWINGS

FIG. 1 is a side elevational view of a tractor wheel according to the present invention.

FIG. 2 is a rear elevational view of the tractor wheel of FIG. 1 and showing two such wheels.

FIG. 3 is a side view a lug of the tractor wheel of FIG. 1.

FIG. 4 is a right end view of the lug of the tractor wheel of FIG. 3.

DETAILED DESCRIPTION OF THE PREFERRED EMBODIMENTS

Although the present invention can be made in many different forms, the presently preferred embodiments are described in this disclosure and shown in the attached drawings. This disclosure exemplifies the principles of the present invention and does not limit the broad aspects of the invention only to the illustrated embodiments.

A new tractor wheel 10 according to the principles or the present invention for use on a tractor 12 (only a portion of the tractor 12 is shown and the tractor portion is shown in phantom) is shown by way of example in FIG. 1. The tractor wheel 10 contacts and penetrates the ground 13 (shown in phantom) to provide increased traction for the wheels 10 and the tractor 12. The tractor wheel 10 includes a round metal rim 14 with a plurality of metal lugs 16 protruding radially outward from the rim 14. The tractor wheel 10 can be mounted to a tractor axle 18 by an axle mount 20 as is known in the art. As shown more clearly in FIG. 2, the tractor wheel 10 includes two rows 22, 24 of lugs 16. An outside row 22 of lugs 16 is positioned on an outside of the rim 14 and an inside row 24 of lugs 16 is positioned on an inside of the rim 14. The outside and inside rows 22, 24 of lugs 16 are spaced apart from each other by a center space 26. Referring to FIGS. 1 and 2, the outside and inside rows 22, 24 of lugs 16 are angularly offset from each other. The outside and inside rows 22, 24 of lugs 16 are angularly offset from each other such that each lug 16 in a given row is centered between two adjacent lugs 16 in the other row of lugs. It is believed that the angular offset of the two rows 22, 24 of lugs 16 tends to enhance traction.

One lug 16 removed from the rim 14 is shown in greater detail in FIG. 3. The lug 16 has a radiused end 28 and an opposite angled end 30. The radiused end 28 of the lug 16 is attached to the outside of the rim 14. Accordingly, the radius of the radiused end 28 and the outside radius of the rim 14 are approximately the same. The lugs 16 are attached to the rim 14 by welding; however, other methods of attaching the lugs 16 to the rim 14 are contemplated, including removably mounting the lugs 16 to the rim 14.

The angled end 30 of the lug 16 has an angled face 32 which forms an angle $\alpha$ and a point 34. The angled face 32 of the lug 16 strikes and penetrates the ground to provide the tractor wheel 10 with increased traction, as further described below.

Operation of the tractor wheel 10 is further described as follows. Two tractor wheels 10 are mounted to the rear axle 18 of the tractor 12 as the tractor's rear wheels. The tractor wheels 10 are mounted on the tractor 12 such that the angled ends 30 of the lugs 16 face the ground 13 just prior to contacting the ground 13 as the wheel rotates in the forward direction as shown by arrow A and the tractor 12 moves in the forward direction as shown by arrow B. In other words, when the tractor 12 is operated in the reverse direction (opposite direction from arrows A and B), the points 34 of the angled ends 30 of the lugs 16 will contact the ground 13 prior to the angled face 32. As the tractor wheel 10 rotates in the forward direction, each angled face 32 of each lug 16 initially contacts the ground 13 in approximately a flat manner, shown in FIG. 1 at 36. Although, the initial contact of the lug 16 with the ground 13 need not be in a flat manner. Further rotation of the tractor wheel 10 causes the lug 16 contacting the ground surface to penetrate the ground 13 and provide traction for forward movement of the tractor 12. Still further rotation of the tractor wheel 10 causes the lug 16 penetrating the ground 13 to pull through to the back side of the wheel 10 until the angled face 32 is lifted out of the ground 13 as can be seen in FIG. 1. In this manner, the tractor wheels 10 ride on the ground 13 by the angled ends 30 of the lugs 16 because the wheel 10 has open space surrounding the lugs 16. The distance between the axle 18 of the tractor wheel 16 and the surface of the ground 13 tends to remain approximately constant for constant ground conditions. The ground penetrating angled ends 30 of the lugs 16 have been found to provide the tractor wheels 10 and the tractor 12 with increased traction. If the wheels 10 are reversed on the tractor 12 such that the points 34 of the lugs 16 first contact the ground 13 as the wheels 10 rotate in the forward direction, the traction is also enhanced, albeit to a lesser degree than when the wheels 10 are mounted as shown in FIGS. 1 and 2.

One tractor wheel 10 made according to the principles of the present invention has a rim 14 of 38" outside diameter by 21" outside width and is made from ⅜" thick steel. The rim 14 has another ⅜" thick piece of steel 15 ½" across the inside of the rim 14 and centered in the middle of the rim 14 to form a double thickness at 15. Fourteen lugs 16 are evenly spaced around the outside of the rim 14 and are 14" long from the outside of the rim 14 to the point 34 on the angled end 30. The overall size of the tractor wheel 10 is about 66" diameter by 21" wide. Each lug 16 has a width of 7" by 7" and is made from a four sided ¼" thick steel lug having rounded corners which forms a hollow elongated box shape as shown in FIGS. 1, 3 and 4. The box shape is cut at the ends to form the angled end 30 and the radiused end 28. The angled face 32 of the lug 16 is welded to the four sides to form a 45° angle α on the angled end 30. The radiused end 28 (which is open prior to attachment to the rim 14) has a 19" radius which corresponds to the 38" diameter of the rim 14. Two rows 22, 24 of lugs 16 on the rim 14 are spaced apart from each other by a 7" spacing 26 such that one row 22 of lugs 16 is on the outside of the rim 14 and the other row 24 of lugs 16 is on the inside of the rim 14. When the tractor wheel 10 is viewed from the side showing the end of the tractor axle 18 (FIG. 1), the two rows 22, 24 of lugs 16 are angularly offset from each other such that each lug 16 in a given row is centered between two adjacent lugs 16 in the other row of lugs.

A Case 800 tractor with a 930 motor was equipped with two of these 66" diameter by 21" wide tractor wheels 10 as the rear wheels of the tractor. The tractor was driven and has been found to pull a weighted sled at about 3–5 mph. The lugs 16 where found to penetrate the ground about 2" to 3". The Case 800 tractor was used to pull a plow having four chisel plows 11" to 12" deep, four 14" moldboard plows and four dikers or dammers with and without the new wheels 10. When the Case 800 tractor having 15½" rubber tires pulled the plow in second gear and ½ throttle, the rubber tires would slip, spin and loose traction when the engine was revved. However, when the tractor was equipped with the wheels 10 of the present invention, the tractor pulled the plow in third gear without slipping and spinning the wheels.

Although the inventive tractor wheel 10 is presently preferred to be constructed of metal, the inventor contemplates other materials could be utilized to construct the tractor wheel 10 without departing from the spirit and scope of the invention. Likewise, other aspects of the tractor wheel 10 could also be varied, for example, the number, angular spacing and size of the lugs 16, the number of rows 22, 24 of lugs 16, and the angle of the angled face 32 on the angled end 30 of the lug 16.

While the presently preferred embodiments have been illustrated and described, numerous changes and modifications can be made without significantly departing from the spirit and scope of this invention. Therefore, the inventor intends that such changes and modifications are covered by the appended claims.

The invention claimed:

1. A tractor wheel for moving an off-road tractor on ground terrain comprising:

a rotatable rim having a tractor axle mounting; and a plurality of hollow box shaped lugs extending radially outward from the rim, the lugs having an angled face at a radial outermost end of the lug, the angled face facing a forward direction of rotation of the tractor wheel;

wherein the tractor wheel rides on the ground terrain on the radial outermost ends of the lugs.

2. The tractor wheel of claim 1 further comprising a plurality of rows of lugs spaced apart from each other along a width of the rim.

3. The tractor wheel of claim 2 wherein the plurality of rows of lugs comprises an outer row of lugs positioned at an outer edge of the rim and an inner row of lugs spaced apart from the outer row of lugs and positioned at an inner edge of the rim.

4. The tractor wheel of claim 2 wherein one row of the plurality of rows of lugs is angularly offset from another row of the plurality of rows of lugs.

5. The tractor wheel of claim 3 wherein the outer and inner rows of lugs are angularly offset from each other.

6. The tractor wheel of claim 1 wherein the angled face forms a 45° angle with the lug.

7. The tractor wheel of claim 1 wherein the lug has a point at a radially outermost portion of the lug formed by the angled face.

8. The tractor wheel of claim 1 further comprising two tractor wheels rotatably mounted to the off-road tractor as rear wheels.

9. The tractor wheel of claim 1 wherein the lugs are made entirely from metal.

10. A tractor wheel for moving an off-road tractor on ground terrain comprising:

a rotatable rim having an outside diameter and a width;

a first row of hollow box shaped lugs extending radially outward from the rim;

a second row of hollow box shaped lugs extending radially outward from the rim; the first and second rows of lugs spaced apart from each other on the width of the rim; and an angled face on a radial outermost end of each lug, the angled face facing a forward direction of rotation of the tractor wheel.

11. The tractor wheel of claim 10 wherein one row of the first and second rows of lugs are angularly offset from each other.

12. The tractor wheel of claim 10 wherein the angled face forms a 45° angle with the lug.

13. The tractor wheel of claim 10 wherein the lug has a point at a radially outermost portion of the lug formed by the angled face.

14. The tractor wheel of claim 10 further comprising two tractor wheels rotatably mounted to the off-road tractor as rear wheels.

15. The tractor wheel of claim 10 wherein the lugs are made entirely from metal.

16. A method of rotating an off-road tractor wheel on ground terrain comprising the steps of:

provyding a rotatable rim having an outside diameter and a width;

providing first and second rows of hollow box shaped lugs extending radially outward from the rim and spaced apart from each other on the width of the rim;

providing an angled face on a radial outermost end of each lug, the angled face facing a forward direction of rotation of the tractor wheel;

rotating the tractor wheel in the forward direction;

contacting the ground terrain with the angled face of the lug;

penetrating the ground terrain with the angled face of the lug;

moving the angled face of the lug penetrating the ground terrain through the ground terrain as the tractor wheel continues to rotate; and removing the angled face of the lug from the ground terrain.

17. The method of claim 16 further comprising the step of supporting the tractor wheel on the ground terrain solely by the lugs penetrating the ground terrain.

18. The method of claim 16 further comprising the step of maintaining the tractor wheel at approximately a constant distance above the ground terrain.

* * * * *